United States Patent [19]

Freudendahl

[11] Patent Number: 4,838,358
[45] Date of Patent: Jun. 13, 1989

[54] COUPLING DEVICE FOR CONNECTING A WHEELED FIELD IMPLEMENT TO A TRACTOR

[75] Inventor: Jan Freudendahl, Sønderborg, Denmark

[73] Assignee: JF-Fabriken - J. Freudendahl A/S, Sonderborg, Denmark

[21] Appl. No.: 14,065
[22] PCT Filed: May 26, 1986
[86] PCT No.: PCT/DK86/00057
 § 371 Date: Jan. 30, 1987
 § 102(e) Date: Jan. 30, 1987
[87] PCT Pub. No.: WO86/06927
 PCT Pub. Date: Dec. 4, 1986

[30] Foreign Application Priority Data

May 30, 1985 [DK] Denmark ............................. 2411/85

[51] Int. Cl.⁴ .............................................. A01B 59/04
[52] U.S. Cl. ..................... 172/125; 56/11.9; 172/677; 172/47; 172/324; 180/53.4
[58] Field of Search ................. 172/125, 677, 47, 324; 56/11.9, 327.1; 180/53.1, 53.4

[56] References Cited

U.S. PATENT DOCUMENTS

| 1,496,999 | 6/1924 | Ray ......................... 56/12.6 |
| 1,661,737 | 3/1928 | Raimer ..................... 180/14.4 |
| 2,171,761 | 9/1939 | Paradise ................... 180/53.4 |
| 2,569,507 | 10/1951 | von Schlegell ............. 60/543 |
| 3,665,685 | 5/1972 | Allard ..................... 56/11.9 |
| 3,715,872 | 2/1973 | Thompson ................. 56/11.9 |
| 4,366,877 | 1/1983 | Vissers .................... 172/125 |
| 4,584,826 | 4/1986 | Bettencourt ............... 56/327.1 |

FOREIGN PATENT DOCUMENTS

| 0027295 | 4/1981 | European Pat. Off. . |
| 0090879 | 10/1983 | European Pat. Off. . |
| 1680820 | 10/1977 | Fed. Rep. of Germany . |
| 1187344 | 11/1957 | France . |
| 1563090 | 2/1968 | France . |
| 828029 | 2/1960 | United Kingdom . |
| 1379601 | 1/1975 | United Kingdom . |
| 1390630 | 4/1975 | United Kingdom . |

Primary Examiner—Richard J. Johnson
Attorney, Agent, or Firm—Burns, Doane, Swecker & Mathis

[57] ABSTRACT

A coupling device for connecting a wheeled agricultural implement having driven working members to a tractor includes a towing connection and a hydraulic motive power transfer with a hydraulic pump. The hydraulic pump is connected to the power take-off of the tractor and to a hose connection connected at its other end with a hydraulic motor on the implement. For pivotal coupling of a drawbar connected with the implement, the towing connection includes a towing device permanently connected with the drawbar adapted to be rigidly, but releasably connected with the ordinary towing means of the tractor, e.g. the lowermost lift arms. To improve its maneuvering ability, the towing device is provided with a linkage positioned behind the rearmost point of the tractor and pivotally connected with the drawbar.

6 Claims, 6 Drawing Sheets

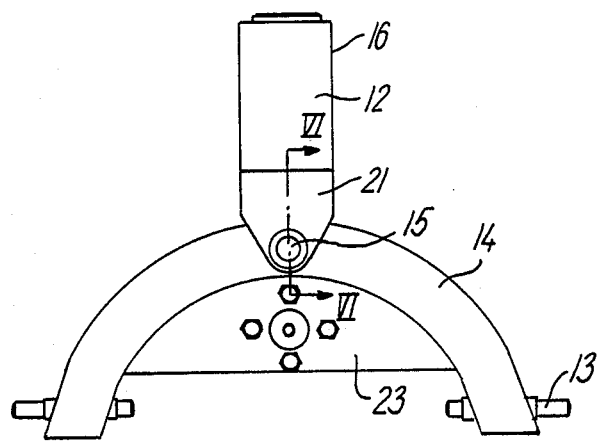
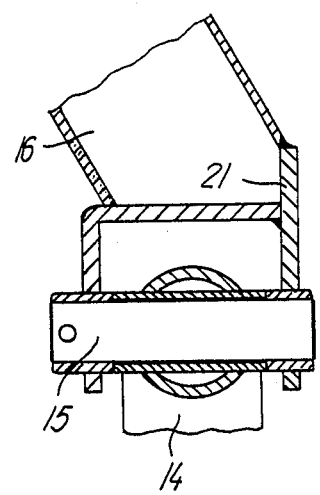
FIG. 4  FIG. 6
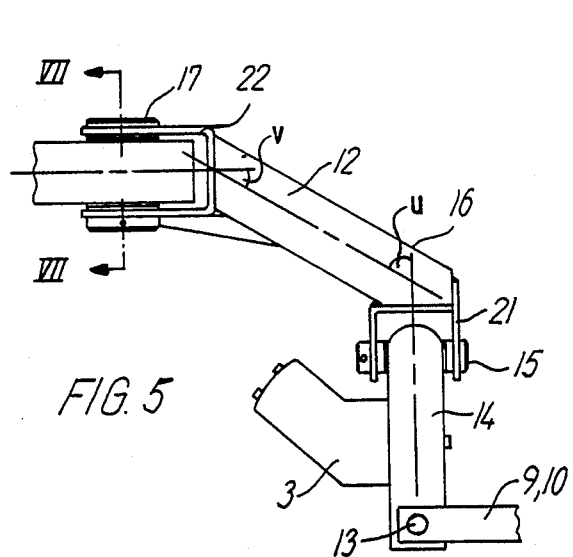
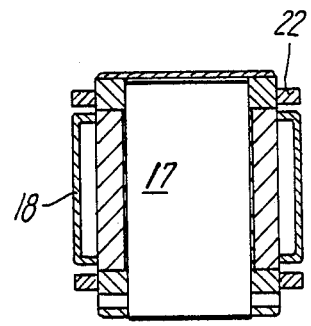
FIG. 5  FIG. 7

COUPLING DEVICE FOR CONNECTING A WHEELED FIELD IMPLEMENT TO A TRACTOR

FIELD OF THE INVENTION

This invention relates to a coupling device for connecting a wheeled agricultural implement with hydraulically driven working means to a tractor provided with mechanical power take-off.

BACKGROUND OF THE INVENTION

For the connection of such wheeled agricultural implements, inter alia cutters, exact cutters and the like, to a tractor, coupling devices are required which, on one hand, ensure a stable towing connection and, on the other hand, provide a transfer of motive power from the power take-off of the tractor to the driven working means of the implement in such a manner that the losses of transfer become as small as possible and the maneuvering ability in the field as optimal as possible so that the implement may follow the ground and the crop, thereby running through the field as efficiently and quickly as possible.

In most of the prior coupling systems either the centrally mounted towing hitch of the tractor or a towing bar between the lifting linkage is used for directly coupling the drawbar of the implement through which the towing force is transferred to the implement. The driving power is simultaneously transferred from the power take-off of the tractor by means of a primary, releasable power transfer shaft to a secondary power transfer shaft journalled in connection with the drawbar and connected with the working means of the implement through a universal joint. The primary, releasable power transfer shaft provided with two universal joints and an intermediate telescopic part is a critical point of the coupling-up. To obtain the optimum degree of efficiency and correct geometry of rotation of the shaft the coupling point between the towing device of the tractor and the drawbar must be located approximately halfway between the power take-off of the tractor and the secondary power intake of the power transfer shaft which generally includes a connecting shaft. Since a large angle of swing is at the same time desired when turning in the field, the primary power transfer shaft has to be comparatively long which gives rise to vibrations and thus to increasing wear and tear and even damage. If the coupling point is moved from the center of the power transfer shaft, the power transfer shaft may, for the same angle of swing, be shorter. In return, however, the maximum angular motion within the universal joints increases, whereby also wear and tear and the risk of damage increases. This problem may partly be eliminated by use of a so-called wide-angle universal joint, but this solution is still insufficient if it is desired to manoeuvre at large angles of swing.

With a view to improve the maneuvering ability and to simultaneously reduce wear and tear in the power transfer a coupling device is known from Danish patent application No. 4283/80, according to which the towing force as well as the motive power is transferred from the tractor to the implement through a supporting unit for a mechanical transmission consisting of at least two parts mutually pivotal about a vertically extending axis. The one part of said supporting unit operates as a releasable pull connection with the tractor lifting linkage and as a journal for the input shaft of the transmission, respectively, said shaft being releasably connected to the power take-off of the tractor by means of a propeller shaft. The other part of the supporting unit operates as a permanent pull connection with the drawbar of the implement and as a direct or indirect journal bearing for the output shaft of the transmission, respectively, firmly connected with a mechanical transmission journalled within or along the drawbar and being in the form of a driving shaft or a belt drive transferring the motive power to the working means of the implement.

The prior coupling device allows for working at large angles of swing between the tractor and the drawbar of the implement without the risk of overloading the primary power transfer shaft. On the other hand, the solution is more complicated and somewhat more expensive than the conventional solution. Moreover, the flexibility in the feed-back to the tractor is obtained to the detriment of essentially reduced margin with a view to designing the drawbar and the implement proper. In view of the fact that the motive power is transferred further to the implement through a mechanical transmission suspended within or along the drawbar, and as the motive power is transferred therefrom to the implement proper through a drive shaft journalled concentrically with the substantially vertical pivot axis for the connection of the drawbar with the implement proper, the power intake constituted by said shaft is vertically positioned and firmly connected with the drawbar as well as with the main frame of the implement proper. The circumstance makes it particularly difficult to obtain a simple, reliable and economical structure of the implement with the working means carried out as a separate and relatively light unit that is suspended and can float within the main frame. This is frequently desired with a view to ensure that the working means effectively follow irregularities in the ground and at the same time are damaged as little as possible by collision with solid hindrances such as large stones or the like.

In order to obtain the same flexibility of the coupling-up between the tractor and the implement as of the coupling device according to the above mentioned patent application it is known as such to make use of a hydraulic transfer of power, a hydraulic pump being directly mounted on the mechanical power take-off of the tractor wherefrom a flexible hose connection is provided along the drawbar of the implement to a hydraulic motor coupled to the working means of the implement. This provides further for obtaining considerably more independence with respect to the design of the draw bar and the implement proper.

The connecting joint between the drawbar and the implement proper may thus be placed in the position most advantageous with a view to maneuvering, straight in front of the field of operation of the working means, without requiring a further transmission connection—as is the case with implements having mechanical transmission. Without causing difficulties with the transmission, the implement may further be provided with separate, floatingly suspended working means possessing the above specified advantages.

In the known coupling device with hydraulic transmission the flexibility of the connection between the tractor and the implement is further provided in that the drawbar of the implement is connected with the central towing hitch of the tractor across a particular pull extension so that the drawbar is pivotally connected with the pull extension secured to the tractor at a point located behind the rearmost vertical tangential plane of the tractor.

This solution makes, however, the connection and disconnection of the implement more difficult in that the pull extension must be mounted and dismounted separately if the tractor shall now and then be used together with other towed implements. Moreover, the yoke pull may vary somewhat from one tractor make to another which might necessitate an individual adaptation to the actual tractor type. The coupling and uncoupling is, however, made particularly difficult because the hydraulic pump that is comparatively heavy and connected with strong hoses shall be lifted between a parking fixture on the drawbar and the power take-off shaft of the tractor which during operation both supports and drives the pump. Consequently, the coupling and the uncoupling also includes mounting and dismounting of special fixtures preventing the pump from rotation or being released during working.

The most essential drawback of the prior coupling device with hydraulic transmission is, however, that it cannot be used in connection with agricultural implements having a high power requirement and which have become continuously more important, since it is not possible to mount the large and heavy pumps necessary for that purpose directly on the power take-off shaft of the tractor without involving unacceptably hard wear and tear and the risk of damage during operation.

OBJECTS AND SUMMARY OF THE INVENTION

It is an object of the invention to provide a coupling device of the type concerned which is applicable in connection with agricultural implements with a high power requirement and which implies a comparatively simple coupling and uncoupling process and at the same time offers the greatest possible ability of maneuvering in the field and ensures the widest possible independence with respect to the structure of the implement.

This is obtained according to the invention in that the towing device is permanently connected with the drawbar so that the drawbar can pivot freely at least about an approximately vertical axis and is adapted to be rigidly but releasably connected with the ordinary towing means of the tractor in such a manner that the coupling joint is located behind the rearmost point of the tractor and that the hydraulic pump is permanently secured to the towing device and is permanently connected with the flexible hoses to a hydraulic motor associated with the working means of the implement while it is adapted to be releasably connected with the power take-off of the tractor.

In the above manner the pump is now not supported by the power take-off shaft of the tractor and there are therefore no longer relevant limits to the weight and size of the pump. The coupling device may therefore also be applicable in connection with large modern agricultural implements with a heavy demand on power.

At the same time the coupling and uncoupling of the implement is comparatively easy to carry out. The towing device operating as pull extension remains connected with the drawbar when the implement is not in use. The towing device further operates as support for the pump which then, apart from a simple mounting and dismounting of a relatively light transmission shaft, is coupled and uncoupled with the towing device. The weight of the towing device, the pump etc. may in this respect be transferred to the base through a supporting device mounted on the towing device or the drawbar.

In addition, the same ability of maneuvering in field and the same independence with a view to the designing of the implement is attained as is the case with the above mentioned prior coupling device with hydraulic transmission.

In a comparatively simnple embodiment, the towing device may include a fixture in the form of a sleeve or the like adapted to be connected with the central towing yoke of the tractor, and the coupling joint may be constituted by a spherical joint allowing the drawbar to freely pivot about an approximately vertical axis and to a certain extent about an arbitrary, approximately horizontal axis.

As the central towing yoke may however have unlike form and location on different tractor models, it is thus necessary to provide the towing device with additional means for individual adaptation to the respective tractor models.

The problem of adaptation may be avoided by a preferred embodiment of the invention which is characterized in that the towing device includes a supporting stirrup with bearing pins for releasable mounting in the lift arms of the tractor so that the towing device can pivot in relation thereto on an approximately horizontal axis and that the hydraulic pump is permanently secured to the supporting stirrup and adapted to be releasably connected with the power take-off of the tractor by means of a connecting shaft provided with a universal joint allowing pivoting of the hydraulic pump together with the supporting stirrup.

In view of the fact that the three-point suspension with the lift arms is standardised as regards different tractor models the coupling device is in this preferred embodiment applicable without adaptation to various types of tractors.

According to the embodiment, the coupling joint includes a linkage preferably connected between the supporting stirrup and the drawbar and allowing the drawbar to pivot in relation to the lift arms about a substantially vertical axis and about a horizontal axis extending substantially parallel to the lift arms.

According to a further suitable embodiment, the hydraulic pump may be integral with a container for hydraulic liquid secured to the towing device. The need for making use of a long and heavy suction hose is thus eliminated which in order to minimize pressure losses must have a large diameter, the hydraulic pump being possibly accommodated within the container and coupled to the power take-off of the tractor across a short connecting shaft with a single or double universal joint. At the same time the advantage is obtained that the weight of the comparatively heavy container is assumed by the rear wheels of the tractor and not by the wheels of the implement.

BRIEF DESCRIPTION OF THE DRAWING

The invention will be explained in detail in the following with reference to the accompanying drawings, in which, FIGS. 4 and 5 are front and side schematic views illustrating parts of the coupling device, on a larger scale, FIGS. 6 and 7 are sectional views of bearing means along the lines VI—VI and VII—VII in FIGS. 4 and 5, respectively.

DETAILED DESCRIPTION OF A PREFERRED EMBODIMENT

Figure 1:
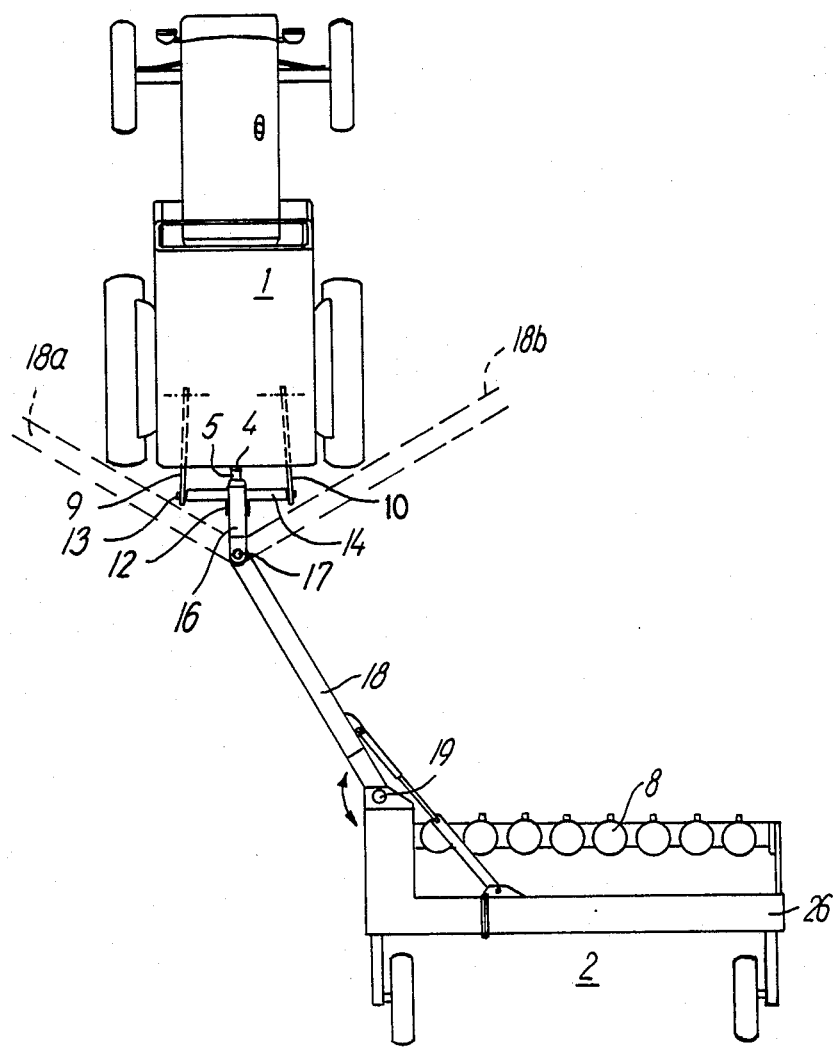
FIGS. 1 to 3 are top, side and rear schematic views illustrating a tractor connected to a wheeled agricultural implement by means of a first embodiment of the coupling device according to the invention.
Figure 2:
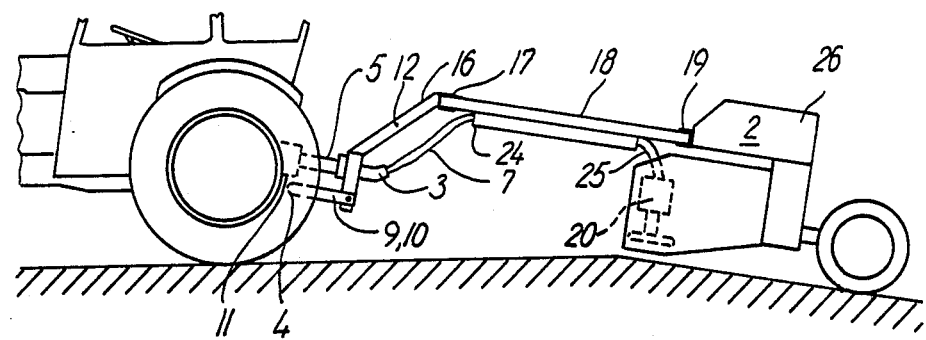
Figure 3:
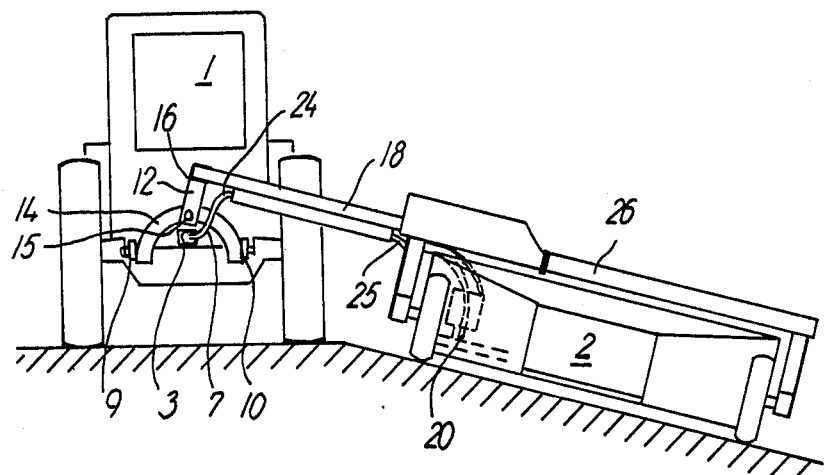

FIGS. 1 to 3 illustrate a tractor 1 connected to a wheeled agricultural implement 2, in this case a cutter, by means of a towing and motive power transferring coupling device according to the invention.

The driving effect to the driven working means, which in the preferred embodiment includes the rotor disc beam 8 of the cutter 2, is transferred hydrostatically by means of a hydraulic pump 3 releasably connected with the mechanical power take-off 4 of the tractor 1 across a connecting shaft 5 having universal joints at each end thereof (not shown) and from which a flexible hose connection 7 is established to and along a drawbar or towbar 18 to a hydraulic motor 20 accommodated within cutter 2 in driving connection with its rotor disc beam 8.

The suction of hydraulic liquid, e.g. oil, to the pump 3 is effected from a container not shown which may be disposed on the supporting frame of the agricultural implement 2 across a suction pipe with comparatively large diameter in order to reduce the pressure as much as possible.

The towing force to the cutter 2 is transferred from the lift arms 9 and 10 of the tractor 1 across a towing device 12 through a coupling joint 17 to the drawbar 18 and further on to the cutter 2 across a coupling joint 19.

The lift arms 9 and 10 are at their opposite free ends provided with a swivel link in which the towing device 12 may be releasably mounted by means of bearing pins 13.

The towing device 12 includes a supporting stirrup 14 which in the illustrated embodiment is designed as an upwardly curving, substantially semi-circular tubing provided at its ends with said bearing pins 13 and approximately centrally thereof with a bearing 15 the form of which is more specifically illustrated in FIG. 6. Besides the supporting stirrup 14 the towing device 12 comprises a short connecting rod 16 slopingly directed to the rear and upwards and which at its one end is pivotally coupled to the bearing 15 and at its other end is pivotally connected with the pull rod 18 through a bearing 17.

In order to establish connection with the bearings 15 and 17 the short connecting rod 16 is at its ends provided with bearing yokes 21 and 22, respectively, forming angles u and v with the connecting rod 16 as illustrated in FIG. 5, the total angle reaching approximately 90°.

As it will appear from FIGS. 2, 4 and 5 the bearing 15 has a substantially horizontal pivot axis parallel to the lift arms 9 and 10 and the bearing 17 has a substantially vertical pivot axis while the bearing 13 has a substantially horizontal pivot axis perpendicular to the pivot axes of the bearings 15 and 17.

As most clearly illustrated in FIG. 1, a very large area of variation for the angle of the drawbar 18 in the horizontal plane in relation to the longitudinal axis of the tractor 1 is obtained due to the location of the bearing 17 at some distance behind the free ends of the lift arms 9 and 10, the area of variation extending between the illustrated dotted marginal positions 18a and 18b of the pull rod 18. The theoretical area of variation is in the illustrated example about ±120°. This provides for obtaining a very little turning radius, thereby rationalizing and facilitating working in field.

Also by the bearing 15 accommodated in the supporting stirrup 14 a considerable area of variation is obtained for the angle in the vertical plane between the connecting rod 16 and thereby the drawbar 18 and the horizontal line connecting the bearings 13, as illustrated in FIG. 3.

In the illustrated embodiment the hydraulic pump 3 is secured to a mounting plate 23 connected with the supporting stirrup 14 and the area of angular variations of the pivoting movement of the supporting stirrup 14 about the axis of rotation of the bearings 13 will therefore be determined by the universal joints of the connecting shaft 5 across which the input shaft of the hydraulic pump 3 is connected with the power take-off 4 of the tractor 1. The pivotal connection in bearings 13 and 15 thus ensures a reasonable maneuvering ability also in case of sloping and undulating ground.

The rod 18 may as illustrated in FIGS. 2 and 3 be embodied as a hollow profile for interior protected passage of the hose connection 7 between an inlet opening 24 and an outlet opening 25 so that the hose connection 7 is only cleared in the area between the bearing 15 and the coupling joint 17 and around the coupling joint 19 where a flexible motive power transfer is required.

The hose connection 7 is passed from the outlet opening 25 directly to the hydraulic motor 20 coupled to the rotor disc beam 8.

Figure 8:
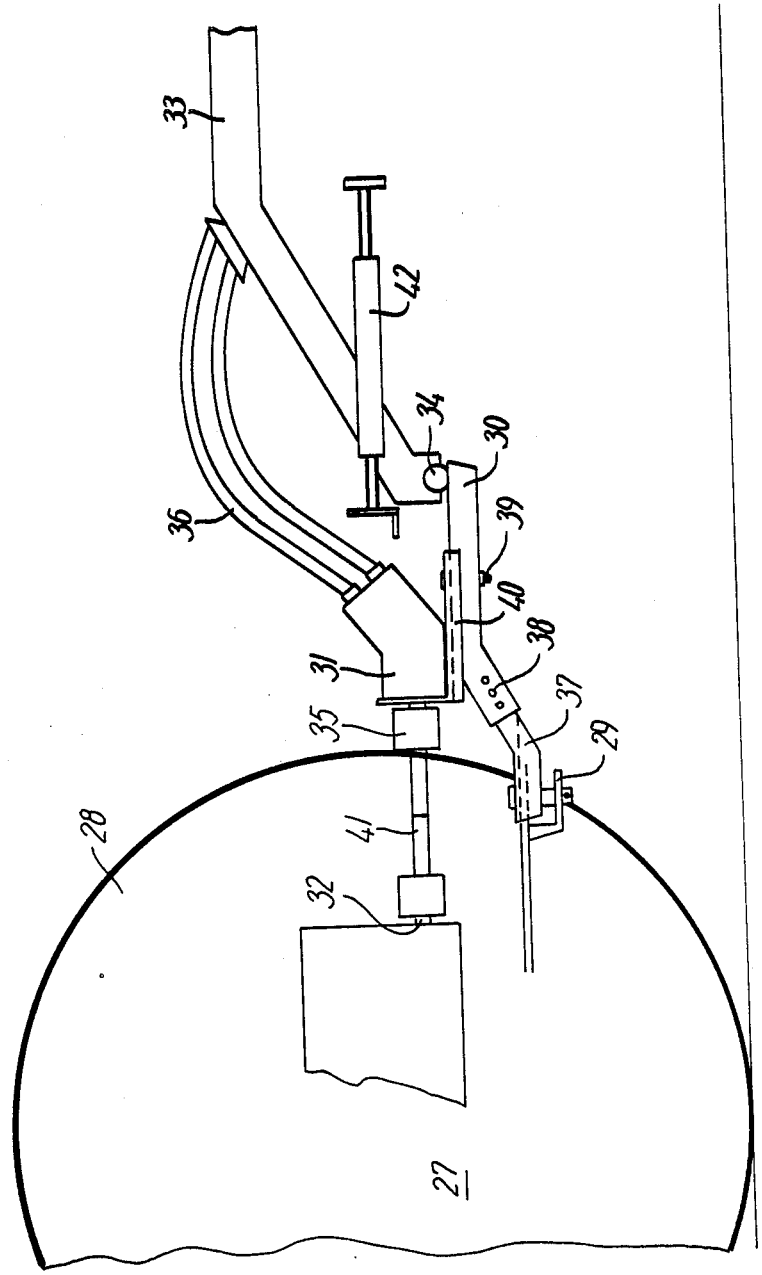
FIG. 8 is a side view of a simplified embodiment of the coupling device.

To illustrate a simplified embodiment of the coupling device according to the invention FIG. 8 shows a side view of the rearmost part of a tractor 27 with one rear wheel 28 and with a central towing yoke 29 to which the towing device is coupled.

The towing device 30 includes a sleeve 37 to be rigidly but releasably connected with the towing yoke 29 of the tractor. The position of the sleeve 37 may be adjusted in relation to the remaining towing device 30 by means of a telescopically operating adjuster 38.

The towing device 30 further accommodates a linkage in the form of a spherical joint 34 for pivotal connection with the drawbar 33 that is again connected with a wheeled agricultural implement not illustrated.

A hydraulic pump 31 is by means of a mounting fixture 40 secured to the towing device 30 so that their mutual positions may be adjusted by means of an adjuster 39.

The hydraulic pump 31 may by means of the adjusters 38 and 39 be secured relative to the towing device 30 in such a manner that the drive shaft 35 of the hydraulic pump 31 is approximately in alignment with the power take-off part 32 of the tractor 27 and at a certain distance therefrom. This offers the hydraulic pump 31 to be easily and reliably coupled in a releasable manner to the power take-off 32 of the tractor 27 by means of a simple, short propeller shaft 41.

The motive power is transferred further from the hydraulic pump 31 to the implement across a pivotal hose connection 36 allowing a wide-ranging pivoting between the towing device 30 and the drawbar 33 in the coupling joint 34.

In the illustrated embodiment, the drawbar 33 is provided with an adjustable base plate 42 able to settle which under parking retains the implement in the parking position. During coupling and uncoupling the base plate 42 likewise transfers part of the weight of the coupling device to the base, thereby materially facilitating such work.

Figure 9:
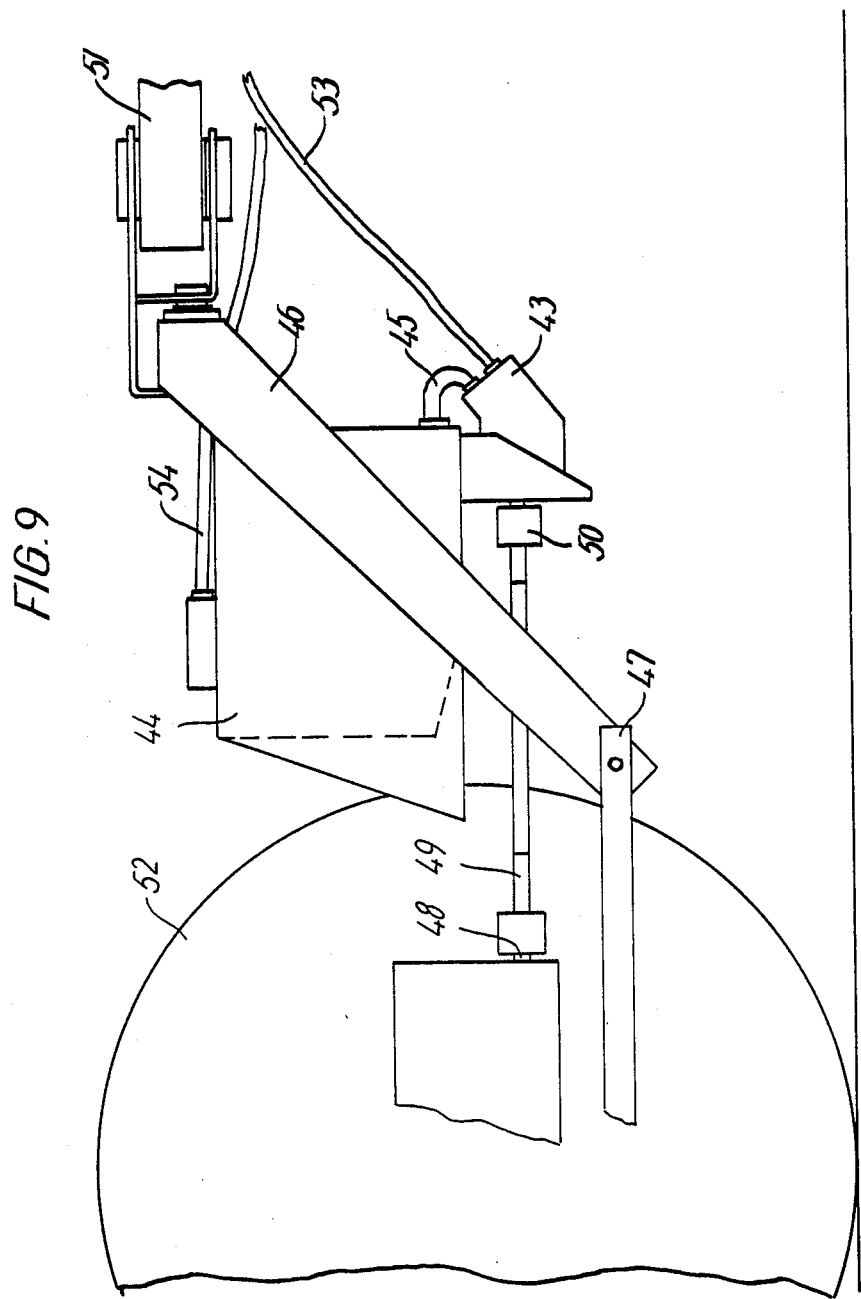
FIG. 9 is a further embodiment.

While hydraulic liquid, e.g. oil, is supplied from a container that may be mounted on the transversal frame of the implement 2, which in the preferred embodiment includes the transversal frame of the cutter. The hydraulic liquid is supplied to the hydraulic pump 3 and 31, respectively, according to the embodiments described in the above, which dependent on circumstances may require a comparatively long and heavy suction pipe making the operation of coupling and uncoupling of the agricultural implement troublesome. In FIG. 9 an embodiment is illustrated in which the hydraulic pump 43 is completely integral with the container 44 and connected therewith across a very short suction pipe 45. The container 44 is secured directly to the towing device, e.g. between the lift arms of a transversal stirrup 46, the end of said lift arms being adapted to be connected with the lift arms 47 of the tractor. The releasable mechanical drive connection of the pump 43 with the power take-off 48 is, as in the embodiment in FIGS. 1 to 7, established across a short connecting shaft 49 with two universal joints 50.

By making the hydraulic pump and the container integrally it is avoided, as already explained, having to make use of a long and consequently heavy and clumsy suction pipe for a separate container on the implement and by mounting the container 44 directly on the towing device at the foremost end of the drawbar 51 the weight of the container is transferred to the rear wheel 52 of the tractor and shall not be supported by the front wheels of the tractor.

The hydraulic liquid is fed from the pump 43 through a flexible pressure hose 53 to the hydraulic motor, not shown, from which the liquid is fed back to the container 44 through a return hose 54 that may be carried out with a substantially smaller diameter than a suction hose, the hydraulic liquid being still under pressure in said back-feed pipe.

Figure 10:
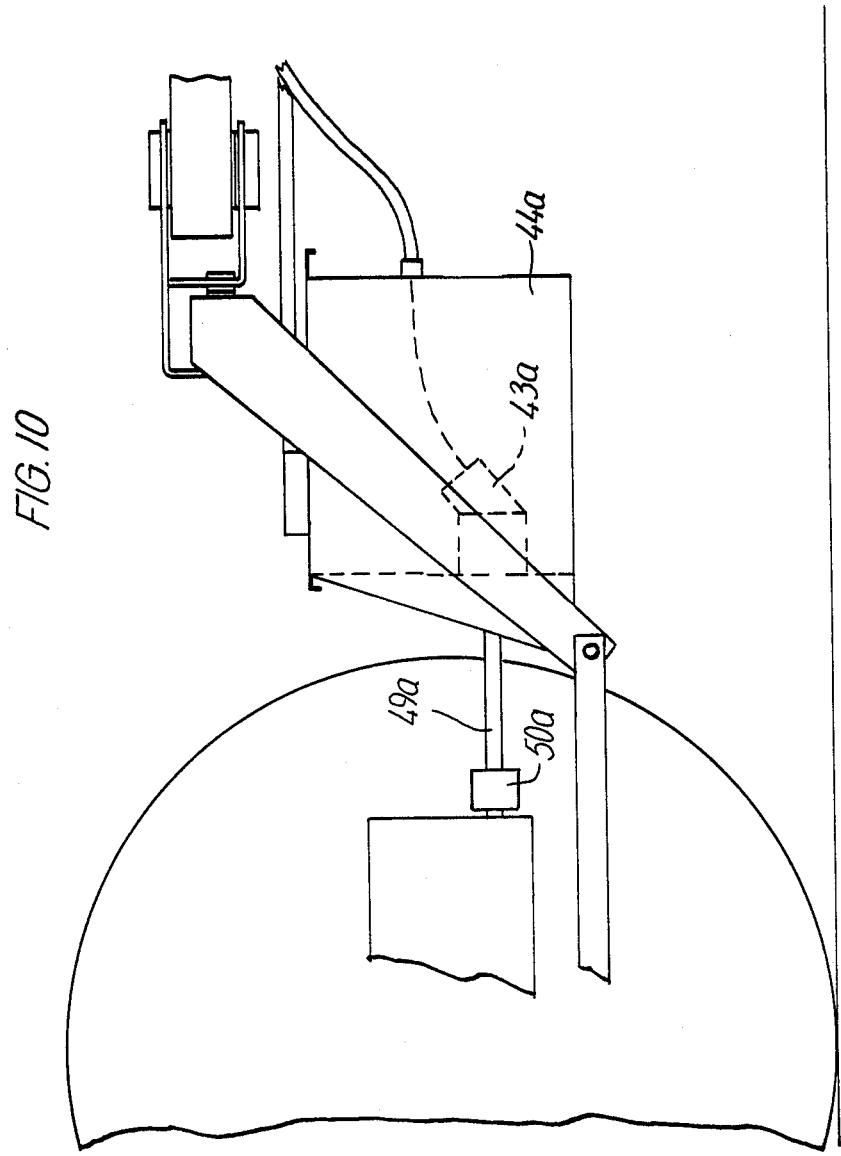
FIG. 10 is a modification of the embodiment in FIG. 9.

By disposing the hydraulic pump 43 within the container 44a, as illustrated in FIG. 10, a suction hose is made entirely superfluous and the connecting shaft 49a may be very short with a single universal joint 50a.

While this invention has been illustrated and described in accordance with a preferred embodiment, it is recognized that variations and changes may be made and equivalents employed herein without departing from the invention as set forth in the claims.

What is claimed is:

1. A coupling device for connecting a wheeled agricultural implement having a hydraulically driven working tool means with a tractor provided with a mechanical power take-off comprising:
   a towbar and a towing hitch device;
   a coupling joint means forming a pivotal connection between the towing hitch device and one end of the towbar;
   the other end of the towbar being pivotally connected with the implement;
   a hydraulic pump mechanically connected with the power take-off of the tractor;
   a flexible hose for providing a fluid power transfer from the hydraulic pump to the working means of the implement while allowing a wide-ranging pivoting of the towbar in the coupling joint means;
   the towing hitch device being permanently pivotally connected with the towbar so that said towbar can pivot freely at least about an approximately vertical axis;
   said towing hitch device including bearing pins for releasably mounting to the lower lift arms of a three-point hitch means of the tractor and be solely supported thereby so that the towing hitch device can freely pivot in relation thereto during operation on an approximately horizontal axis and wherein the coupling joint is located upwardly and rearwardly of said horizontal pivot axis and is behind the rearmost point of the tractor;
   the hydraulic pump being permanently secured to the towing hitch device and permanently connected by means of the flexible hose to a hydraulic motor associated with the working tool means of the implement and wherein the hydraulic pump is adapted to be releasably connected with the power take-off of the tractor by means of a connecting shaft.

2. A coupling device as claimed in claim 1, wherein the towing device includes a supporting stirrup and is mounted to lift arms of the tractor and the hydraulic pump is permanently secured to the supporting stirrup and adapted to be releasably connected with the power take-off of the tractor by means of a connecting shaft provided with a universal joint allowing pivoting of the hydraulic pump together with the supporting stirrup.

3. A coupling device as claimed in claim 2, wherein the towing device includes a linkage connected between the supporting stirrup and the drawbar and allowing the drawbar to pivot in relation to the lift arms about a substantially vertical axis and about a horizontal axis extending substantially parallel to the lift arms.

4. A coupling device as claimed in claim 2, wherein the supporting stirrup is formed of a curved, substantially semi-circular tube provided at its ends with said bearing pins and approximately halfway between the lift arms is provided a bearing for a permanently pivotal connection with said linkage about said horizontal axis extending in parallel with the lift arms and that said linkage comprises a short connecting rod slopingly directed to the rear and upwards, said coupling joint being positioned at the rearmost end of said rod for permanently pivotal connection with the drawbar about a substantially vertical axis.

5. A coupling device as claimed in claim 1, wherein the hydraulic pump is integral with a container for hydraulic liquid secured to the towing device.

6. A coupling device as claimed in claim 5, wherein the hydraulic pump is accommodated within said container.

* * * * *